Patented May 23, 1933

1,910,031

UNITED STATES PATENT OFFICE

LOWELL H. MILLIGAN AND CHARLES HERBERT QUICK, OF WORCESTER, MASSACHUSETTS, ASSIGNORS TO NORTON COMPANY, OF WORCESTER, MASSACHUSETTS, A CORPORATION OF MASSACHUSETTS

ABRASIVE ARTICLE OF CERAMIC BONDED CRYSTALLINE ALUMINA GRANULES

No Drawing.   Application filed March 8, 1930. Serial No. 434,448.

This invention relates to abrasive articles of crystalline alumina granules bonded by a vitrified ceramic material.

The grinding wheels of standard commercial use are made of abrasive grains bonded into an integral structure by means of various bonds, such as rubber, shellac, synthetic resin, sodium silicate, and what are known as vitrified ceramic materials. But the major portion belongs to this last classification and contains a vitrifiable ceramic bond having clay as an essential ingredient which is matured to a glassy or a porcelanic body by a suitable heat treatment. Such a ceramic bond depends upon the use of clay to make the mass moldable in the green state, and vast amounts of experimental data dealing with the moldability as well as the vitrifying and bonding qualities of the ceramic mixtures commonly employed have been compiled by the various ceramists.

The two major types of grinding wheels manufactured today have either silicon carbide or crystalline alumina for the granular abrasive material, and these ingredients are so different in their physical and chemical characteristics that the bonds which may be employed for one are not ordinarily satisfactory for the other. The practical developments in this art have resulted in silicon carbide being bonded by high fusing porcelanic materials while crystalline alumina has been bonded best by ceramic bonds containing fluxes which render the bond wholly fluid at the temperature of vitrification. That is, the bonds used for crystalline alumina have ordinarily been made of ball clay, slip clay and feldspar in varying proportions depending upon the type of wheel being manufactured. Of these materials, the ball clay fuses only at a high temperature, but it is desirable nevertheless because it renders the mixture moldable during the green or unfired condition. The slip clay serves as a flux and is employed to lower the fusing point of the bond and cause it to mature to a completely melted glass at a convenient firing temperature. The feldspar contributes its chemical constituents, such as soda, potash, alumina and silica, and these intermingle with and dissolve in the other constituents that are present, during the firing in the kiln, so as to result in the formation of the bond glass.

This type of bond for crystalline alumina granules has various objectionable characteristics, one of which is the ease with which it swells and causes a change in the shape of the article. To counteract the detrimental effects of swelling, it has heretofore been necessary to provide large pore spaces between the abrasive grains in order that the bond might swell into the pore spaces during the heating operation. Hence it has not been feasible to use as large a percentage of bond as is sometimes required for a desired strength of wheel, it being noted that within certain limits the strength of the bonded structure is greater when a larger amount of bond is employed. If the swelling within the wheel takes place to such an extent as to disarrange the abrasive grains in their positions, then the wheel may be totally worthless for grinding purposes. A further problem involved in grinding wheel manufacture resides in maintaining a given color for the finished article. It is found that, although all the manufacturing conditions are apparently the same, yet at one time the product will come dark colored and at another time it will be of an entirely different color, so that the customer is liable to think that he is not getting the same wheel in two cases.

The primary objects of this invention are to overcome such difficulties and to provide an abrasive article of ceramic bonded crystalline alumina granular material which will not be detrimentally swelled during the firing operation, which may contain a greater proportion of bond for a given amount of granular abrasive material than has heretofore been found feasible, and which will be of a uniform color and have desirable abrading and other characteristics.

With these and other objects in view as will be apparent to one skilled in the art, this invention resides in the composition set forth in the specification and covered by the claims appended hereto.

In the course of our experimentation we have discovered that when a grinding wheel is made up with crystalline alumina granules and a bond of a vitrifiable ceramic material, and is heated to about 1200° C. various important reactions take place, and it is noticeable that a gas is evolved which tends to swell the article. This gas has been found to be oxygen and it is believed to be liberated by the dissociation of ferric oxide into ferrosoferric oxide and oxygen gas. This reaction may be written: $6Fe_2O_3 \rightarrow 4Fe_3O_4 + O_2$. The oxygen gas liberated by this reaction at first swells the bond into a honey combed structure, but as the temperature is maintained in the kiln for a considerable time during the soaking period, the gas ultimately escapes from the molten bond and the latter eventually subsides to a dense glass containing the $Fe_3O_4$.

As a result of this evolution of gas, it has been considered necessary heretofore that vitrified wheels of this type be made of such a composition that sufficient porosity and permeability be provided whereby the gases formed during the swelling stage may escape from the article without causing any disturbance of the abrasive grains. Also, it has been found that even if the composition has been so calculated as to provide a porous wheel under normal manufacturing conditions, yet some unexpected conditions in the kiln treatment often cause the grinding wheel to swell and so come out in a valueless condition. For example, the tendency for the grains to be disarranged in the structure depends somewhat upon the rate at which the dissociation of the ferric oxide takes place, hence a rapid evolution of the oxygen gas will produce a swelled product and one which cannot be used commercially, whereas if the same amount of oxygen gas had been evolved more slowly the wheel would not have been swelled. These variations in the heating conditions within the kiln occur by accident and cannot be controlled at all times. It therefore is highly desirable that the bond be so constituted as to avoid this difficult condition of affairs.

The ordinary slip clay which is utilized in grinding wheel bonds is found to be the chief source of this ferric oxide; and we therefore propose to utilize a bond which does not contain slip clay and which does not contain appreciable amounts of ferric oxide. It is therefore a primary feature of this invention to employ as a bond for crystalline alumina granular material a vitrifiable ceramic material, containing a clay which renders the mass moldable in the green state, and having an alumina content of at least 10% by weight of the total content of the bond, and being substantially free from iron compounds, or containing less than 1% of iron or iron containing compounds, calculated as ferric oxide, so as to avoid the detrimental swelling which would take place if iron oxide were present. This bond, moreover, has such a composition that when the formed mixture of crystalline alumina grains and the bond is fired under heat conditions which are equivalent to Orton cone 13, or one of a lower number which is above red heat, the bond will mature to a completely glassy condition.

Of the various bond compositions which may be employed within the scope of this invention, we preferably utilize a ball clay or other clay which will make the mass moldable while in the green state. This clay, together with other alumina-containing ingredients such as feldspar which may be present, is used in such an amount that the alumina content of the bond will be at least 10%, and preferably higher. In order to render this ceramic bond fluid so that it may become a clear glass under a kiln treatment of cone 13 or lower, we incorporate with the plasticizing or molding clay a flux or fluxes which reduce the temperature of melting and so make the body mature to the proper kind of a glass. A suitable flux for this purpose is found in such substances as magnesia and lime, the latter of which may be incorporated in the body in the form of whiting or calcium carbonate. Other materials may be added to the bond in order to modify the plastic or molding qualities of the raw bond to any desired degree, or to alter the chemical composition of the final bond glass in order to impart to it properties that may be desired. For example, non-plastic, substantially iron-free ingredients, such as feldspar and silica, may be used for these purposes. Materials such as lead oxide, borax, zinc oxide, barium oxide, strontium oxide, etc. may also be added when it is desired to impart special properties to the bond glass.

As a specific example of a composition which will be satisfactory for this purpose we may employ the following ingredients in the proportions specified:

| | Per cent by weight |
|---|---|
| Kentucky No. 5 ball clay | 31 |
| Maine feldspar | 52 |
| Flint | 8 |
| Whiting | 6 |
| Magnesia | 3 |

The chemical composition of this bond has been calculated to be approximately as follows in percentages by weight:

| $SiO_2$ | $Al_2O_3$ | $Fe_2O_3$ | MgO | CaO | $Na_2O$ | $K_2O$ | $TiO_2$ |
|---|---|---|---|---|---|---|---|
| 68.6 | 17.2 | 0.4 | 2.8 | 3.8 | 1.8 | 4.6 | 0.8 |

This bond matures to adequate fluidity for bonding crystalline alumina granules in a ceramic kiln in the vicinity of Orton cone 12 or around 1250° to 1300° C. The raw constituents of this bond are all substantially insoluble in water, hence it is possible to make a vitrified wheel successfully by what is known as the puddled process, in which the bond and abrasive ingredients are mixed with water and are then shaped to a desired form while in this wet condition. A grinding wheel may be made up of this composition by using crystalline alumina grains of 36 grit size, i. e. those grains which just pass through a screen having 36 meshes per linear inch, and in which 89% by weight of crystalline alumina grains are employed with 11% of the bond. The detailed procedure of making the grinding wheel is in accordance with standard practice as is well understood by those skilled in the art.

We may employ various bond ingredients within the scope of this invention, it being essential, however, that a clay material be employed to make the mass moldable and that a flux be utilized, if the clay melts at too high a temperature, so that the bond may mature at a temperature below Orton cone 13. Slip clay, which has heretofore been an essential ingredient in the manufacture of vitrified grinding wheels, is a material that tends to vary in chemical composition even when obtained from different planes in the same deposit. This tends to introduce chemical variations into the composition of vitrified bonds made with it, which may cause undesired characteristics to be developed in the bonds. In accordance with this invention it is now possible to omit the slip clay and, in addition to the other advantages obtained by this procedure as previously described, the chemical composition of the bond may now be controlled more accurately and satisfactorily than heretofore.

A further advantage in the use of a bond having a low iron content resides in the fact that a glass made in accordance with this invention is substantially transparent and therefore permits the color of the abrasive grains themselves to show, hence if a white-colored abrasive is employed the resulting grinding wheel will be white. Heretofore, it has been found that the color of a glassy bond containing slip clay varied considerably from time to time depending upon the heating and cooling treatments that the bond received as well as the character of the atmosphere to which it was exposed while in a molten condition; and the colors of grinding wheels as previously made have varied all the way from light yellows through the reds and red-brown mixtures to an almost opaque black. This was largely due to the presence of the iron oxide introduced into the bond by the slip clay. A bonded wheel made up in accordance with our invention will not vary in its color in such manner because of the absence of the color-producing iron compound.

While as above stated the alumina content of the bond should be at least 10%, we ordinarily prefer to use as much as is employed in the above example and there may be more to good advantage. We furthermore prefer that in the ordinary bond the fluxing ingredients constitute at least as high a percentage of the total mass as employed above, which is 13% as found by adding together the percentages of the alkali and alkaline earth metal compounds. It however will be understood that we may vary these proportions widely within the scope of the invention as defined herein.

It will also be understood that care should be taken in selecting the abrasive grains to be used with this bond of low iron content. Certain kinds of abrasive grains contribute swelling constituents and these might mask the otherwise desirable effects obtained with this special bond. When abrasive grains that have a minimum content of swelling constituents are selected, it is found that a larger amount of bond may be used without producing swelling than is the case when the ordinary vitrifiable bonds of the prior art are employed. That is, fired wheels may be made which may contain the same volume percent of abrasive grains but a higher volume percent of bond without having swelling take place. Hence, it is possible now to use more bond than before and so to obtain a stronger wheel.

It is to be understood that the term "abrasive article" as found in the claims appended hereto is to be interpreted broadly to cover refractory articles, tiles, filter plates and all other articles which are made of crystalline alumina granules bonded by vitrified ceramic materials in accordance with the above disclosure, as well as compositions of material intended to be used in the manufacture of such articles.

Having thus described our invention, what we claim as new and desire to secure by Letters Patent is:

1. An abrasive article comprising crystalline alumina granules bonded by a vitrified ceramic bond of the glassy type, characterized in that the ceramic mixture forming the bond contains a highly plastic clay which renders the bond moldable in the raw condition and an added flux which causes the bond to mature into a substantially glassy, viscous liquid condition at a temperature below Orton cone 13 and unite the granules into an integral body, said bond containing insufficient slip clay or iron compounds to cause material swelling of the article during the firing operation, and the iron content being less than 1% by weight of the total bond.

2. An abrasive article of the type covered by claim 1 which has an alumina content of at least 10% by weight of the total bond.

3. An abrasive article of the type covered by claim 1 having an alumina content of at least 10% by weight of the bond and a flux constituting at least 13% by weight of the total bond, which is substantially iron-free and will mature to a substantially clear glass without detrimental swelling.

Signed at Worcester, Massachusetts, this 6th day of March, 1930.

LOWELL H. MILLIGAN.
    CHARLES HERBERT QUICK.